(12) United States Patent
Cheng et al.

(10) Patent No.: US 11,482,182 B2
(45) Date of Patent: Oct. 25, 2022

(54) ELECTRONIC DEVICE

(71) Applicant: InnoLux Corporation, Miao-Li County (TW)

(72) Inventors: Ya-Wen Cheng, Miao-Li County (TW); Yu-Chen Huang, Miao-Li County (TW); Shun-Cheng Chen, Miao-Li County (TW); Jiunn-Shyong Lin, Miao-Li County (TW); I-An Yao, Miao-Li County (TW)

(73) Assignee: INNOLUX CORPORATION, Chu-Nan (TW)

( * ) Notice: Subject to any disclaimer, the term of this patent is extended or adjusted under 35 U.S.C. 154(b) by 0 days.

(21) Appl. No.: 17/239,078

(22) Filed: Apr. 23, 2021

(65) Prior Publication Data
US 2021/0366414 A1 Nov. 25, 2021

(30) Foreign Application Priority Data

May 25, 2020 (CN) .......................... 202010451969.6

(51) Int. Cl.
*G09G 3/34* (2006.01)
*G02F 1/1335* (2006.01)
*G02F 1/13357* (2006.01)

(52) U.S. Cl.
CPC ..... *G09G 3/3413* (2013.01); *G02F 1/133605* (2013.01); *G02F 1/133607* (2021.01); *G02F 1/133611* (2013.01); *G02F 1/133603* (2013.01); *G02F 1/133614* (2021.01); *G09G 2330/04* (2013.01)

(58) Field of Classification Search
CPC ......... G02F 1/133602; G02F 1/133603; G02F 1/133605; G02F 1/133607; G02F 1/133611; G09G 3/3413
See application file for complete search history.

(56) References Cited

U.S. PATENT DOCUMENTS

| | | | |
|---|---|---|---|
| 2009/0231847 A1* | 9/2009 | Pan | G02B 6/0023 362/240 |
| 2018/0059482 A1* | 3/2018 | Li | G02F 1/133606 |
| 2020/0110309 A1* | 4/2020 | Masuda | G02F 1/133611 |
| 2020/0379298 A1* | 12/2020 | Notoshi | G02F 1/133603 |

FOREIGN PATENT DOCUMENTS

| | | | | |
|---|---|---|---|---|
| CN | 110716343 A | | 1/2020 | |
| CN | 111338126 A | * | 6/2020 | |
| CN | 111722435 A | * | 9/2020 | ........... G02B 6/0051 |
| CN | 112882281 A | * | 6/2021 | |
| EP | 3053874 A1 | * | 8/2016 | ........... G02B 6/0003 |
| KR | 20080032506 A | * | 10/2006 | |
| KR | 20100009827 A | * | 7/2008 | |

* cited by examiner

*Primary Examiner* — Koosha Sharifi-Tafreshi
(74) *Attorney, Agent, or Firm* — Muncy, Geissler, Olds & Lowe, P.C.

(57) ABSTRACT

An electronic device including a backlight module is disclosed. The backlight module includes: a substrate; a plurality of light emitting diodes disposed on the substrate, wherein the plurality of light emitting diodes are blue light emitting diodes; a protection layer disposed on the substrate and covering the plurality of light emitting diodes; and a color conversion element, disposed on the plurality of light emitting diodes.

19 Claims, 5 Drawing Sheets

ELECTRONIC DEVICE

CROSS REFERENCE TO RELATED APPLICATION

This application claims the benefits of the Chinese Patent Application Serial Number 202010451969.6, filed on May 25, 2020, the subject matter of which is incorporated herein by reference.

BACKGROUND

1. Field

The present disclosure relates to an electronic device. More specifically, the present disclosure relates to an electronic device comprising a backlight module with a specific structure.

2. Description of Related Art

In the display device, the effect of high dynamic range (HDR) can be achieved when the local dimming technique is applied to the direct type backlight module using light emitting diodes as light sources. However, whether the current backlight module can be replaced by the backlight module using the local dimming technique is determined by its manufacturing cost.

When the number of the used light emitting diodes is decreased, the manufacturing cost of the backlight module can be reduced but the problem of insufficient brightness may be occurred. In addition, when the light emitting diodes are used as the light sources, the hot spots of the light emitting diodes may cause the visual effect of the display device unfavorable, and the problem of power dissipation may be occurred.

Therefore, it is desirable to provide a display device with a novel backlight module, which can achieve the purpose of reducing the disposition density of the light sources (i.e. the light emitting diodes), decreasing the manufacturing cost, improving the light efficiency, decreasing the power consumption or improving the visual effect of the display device.

SUMMARY

The present disclosure provides an electronic device comprising a backlight module. The backlight module comprises: a substrate; a plurality of light emitting diodes disposed on the substrate, wherein the plurality of light emitting diodes are blue light emitting diodes; a protection layer disposed on the substrate and covering the plurality of light emitting diodes; and a color conversion element, disposed on the plurality of light emitting diodes.

Other novel features of the present disclosure will become more apparent from the following detailed description when taken in conjunction with the accompanying drawings.

DETAILED DESCRIPTION OF EMBODIMENT

Figure 1:
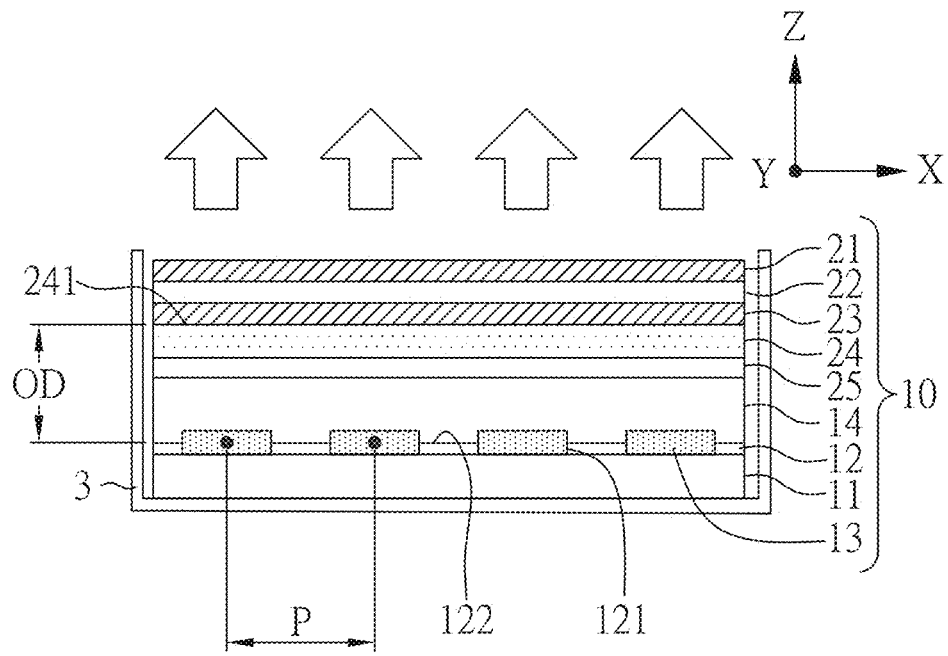
FIG. 1 is a cross-sectional view of a backlight module of an electronic device according to one embodiment of the present disclosure.

Different embodiments of the present disclosure are provided in the following description. These embodiments are meant to explain the technical content of the present disclosure, but not meant to limit the scope of the present disclosure. A feature described in an embodiment may be applied to other embodiments by suitable modification, substitution, combination, or separation.

It should be noted that, in the present specification, when a component is described to comprise an element, it means that the component may comprise one or more of the elements, and it does not mean that the component has only one of the element, except otherwise specified.

Moreover, in the present specification, the ordinal numbers, such as "first" or "second", are used to distinguish a plurality of elements having the same name, and it does not means that there is essentially a level, a rank, an executing order, or an manufacturing order among the elements, except otherwise specified. A "first" element and a "second" element may exist together in the same component, or alternatively, they may exist in different components, respectively. The existence of an element described by a greater ordinal number does not essentially means the existence of another element described by a smaller ordinal number.

In the present specification, except otherwise specified, the feature A "or" or "and/or" the feature B means the existence of the feature A, the existence of the feature B, or the existence of both the features A and B. The feature A "and" the feature B means the existence of both the features A and B. The term "comprise(s)", "comprising", "include(s)", "including", "have", "has" and "having" means "comprise(s)/comprising but is/are/being not limited to".

Moreover, in the present specification, the terms, such as "top", "upper", "bottom", "front", "back", or "middle", as well as the terms, such as "on", "above", "over", "under", "below", or "between", are used to describe the relative positions among a plurality of elements, and the described relative positions may be interpreted to include their translation, rotation, or reflection.

Furthermore, the terms recited in the specification and the claims such as "above", "over", or "on" are intended not only directly contact with the other element, but also intended indirectly contact with the other element. Similarly, the terms recited in the specification and the claims such as "below", or "under" are intended not only directly contact with the other element but also intended indirectly contact with the other element. If a first element is disposed on a second element, the first element may be directly disposed on the second element or another element may be disposed between the first element and the second element. If a first element is disposed directly on a second element, the first element directly contacts the second element, and no other element exists between these two elements.

Furthermore, the terms recited in the specification and the claims such as "connect" is intended not only directly connect with other element, but also intended indirectly connect and electrically connect with other element.

Furthermore, the term "adjacent" recited in the specification and the claims is used to describe that two elements are adjacent, but these two elements do not necessarily contact.

Furthermore, when a value is in a range from a first value to a second value, the value may be the first value, the second value, or another value between the first value and the second value.

Moreover, in the present specification, a value may be interpreted to cover a range within ±20% of the value, and in particular, a range within ±10%, ±5%, ±3%, ±2%, ±1% or ±0.5% of the value, except otherwise specified. The value provided in the present specification is an approximate value, which means the meaning "about" is also included in the present disclosure without specifically specifying "about".

In the present specification, except otherwise specified, the terms (including technical and scientific terms) used herein have the meanings generally known by a person skilled in the art. It should be noted that, except otherwise specified in the embodiments of the present disclosure, these terms (for example, the terms defined in the generally used dictionary) should have the meanings identical to those known in the art, the background of the present disclosure or the context of the present specification, and should not be read by an ideal or over-formal way, except otherwise specified.

The electronic device of the present disclosure may comprise a display device, a lighting device, a touch display device, a curved display device or a free shape display device, but the present disclosure is not limited thereto. The electronic device of the present disclosure may be a bendable or a flexible display device. The display medium of the display device may include, for example, liquid crystals, quantum dots (QDs), fluorescence, phosphors, other suitable display medium, or a combination thereof; but the present disclosure is not limited thereto. In the present disclosure, the light emitting diode, for example, comprises a light emitting diode (LED), a mini-light emitting diode (mini LED), a micro-light emitting diode (micro LED), or a quantum-dot light emitting diode (QLED or QDLED), other suitable diodes or a combination thereof; but the present disclosure is not limited thereto. The display device may include, for example, a tiled display device, but the present disclosure is not limited thereto. The electronic device of the present disclosure may be a combination of the aforesaid devices, but the present disclosure is not limited thereto. In addition, the shapes of the electronic device of the present disclosure is not particularly limited, and may be rectangle, circular, polygon, a shape with curved edges or other suitable shapes, but the present disclosure is not limited thereto. The electronic device of the present disclosure may comprise a driving system, a control system, a light source system, a shelving system or other peripheral system to support the electronic device or the tiled electronic device.

FIG. 1 is a cross-sectional view of a backlight module of an electronic device according to one embodiment of the present disclosure.

The electronic device of the present embodiment comprises a backlight module 10, which is a direct type backlight module. The backlight module 10 comprises: a substrate 11; a plurality of light emitting diodes 13 disposed on the substrate 11, wherein the light emitting diodes 13 are blue light emitting diodes; a protection layer 14 disposed on the substrate 11 and covering the light emitting diodes 13; and a color conversion element 24, disposed on the light emitting diodes 13.

In addition, the backlight module 10 of the present embodiment may further comprise a reflective layer 12 disposed on the substrate 11 and disposed between two adjacent light emitting diodes 13. Herein, the reflective layer 12 may be firstly formed on the whole surface of the substrate 11, the reflective layer 12 is then patterned to form a plurality of holes 121, and then the light emitting diodes 13 are disposed in the holes 121. In the present embodiment, each of the light emitting diodes 13 is disposed correspondingly to one of the holes 121, but the present disclosure is not limited thereto. In another embodiment of the present disclosure, one or more light emitting diodes 13 may be disposed in one of the holes 121.

The substrate 11 may be a normal substrate or a substrate comprising active elements. The normal substrate may comprise a non-flexible substrate or a flexible substrate. The material of the normal substrate may comprise glass, quartz, silicon wafer, sapphire, polycarbonate (PC), polyimide (PI), polypropylene (PP), polyethylene terephthalate (PET), other suitable material, or a combination thereof. In addition, a circuit electrically connected to the light emitting diodes 13 may be formed on the normal substrate to drive the light emitting diodes 13. The substrate comprising the active elements can be the aforesaid normal substrate with the active elements formed thereon. The active elements may drive the light emitting diodes 13. Examples of the active elements may comprise transistors.

The reflective layer 12 may comprise a material with reflectivity, for example, white ink or metals (for example, Ag, Al, Au, Cr or an alloy thereof).

The light emitting diodes 13 may respectively be a bare light emitting diode or a packaged light emitting diode. Herein, the "bare light emitting diode" refers a light emitting diode which may comprises a LED chip including electrodes (for example, the p-electrode and the n-electrode), a semiconductor layer and a light emitting layer, but does not comprise a packaged layer. The "packaged light emitting diode" refers to a light emitting diode which may comprise a LED chip including electrodes (for example, the p-electrode and the n-electrode), a semiconductor layer and a light emitting layer, and also comprises a packaged layer. The light emitting diodes 13 may be blue light emitting diodes. Herein, the light emitting layer may comprise phosphors, quantum dots or a combination thereof. In the present embodiment, the light emitting diodes 13 are, for example, bare light emitting diodes.

In addition, the light emitting diodes 13 may be light emitting diodes with plural light emitting surfaces. In the present embodiment, except for the surface of the LED chip facing to the substrate 11, all the other surfaces of the LED chip may emit light. In other words, the surface facing the protection layer 14 and side surfaces of the LED chip may emit light. In the present embodiment, the light emitting diodes 13 are light emitting diodes with five light emitting surfaces.

Furthermore, the light emitting diodes 13 may be flip-chip light emitting diodes, and the light emitting diodes 13 have electrodes to electrically connect to the circuits or active elements on the substrate 11.

The protection layer 14 may cover the light emitting diodes 13. In the present embodiment, the protection layer 14 directly contacts the light emitting diodes 13 to protect the light emitting diodes 13. In addition, the protection layer 14 may also provide at least a part of an optical distance. The explanation of the optical distance will be described after. The material of the protection layer 14 may include an optical gel, a silicone gel, a semi-transparent gel or a combination thereof, and scattering particles may be selectively added into the material of the protection layer 14. In addition, the refractive index (n) of the protection layer 14 may be ranged from 1.4 to 1.6 ($1.4 \leq n \leq 1.6$).

The backlight module 10 of the present embodiment may further comprise: a first brightness enhancement film 21, a diffusion film 22, and a second brightness enhancement film 23, disposed on the color conversion element 24, wherein the diffusion film 22 is disposed between the first brightness enhancement film 21 and the second brightness enhancement film 23. Herein, the first brightness enhancement film 21 and the second brightness enhancement film 23 are respectively a prism film for increasing the brightness of the backlight module, and the diffusion film 22 is a film for uniformly distributing the light from the light source of the backlight module.

The color conversion element 24 is an element capable of converting the blue light into the white light. In the present embodiment, the color conversion element 24 can be a color conversion film which may comprise phosphors, quantum dots, dyes or a combination thereof.

The backlight module 10 of the present embodiment may further comprise: a light recycle layer 25 disposed on the protection layer 14, wherein the color conversion element 24 is disposed on the light recycle layer 25. The light recycle layer 25 can be a multi-layered film formed by alternately laminated films with different refractive index. A light transmittance at wavelengths between 420 nm to 480 nm (T1) of the light recycle layer 25 may be greater than 75% (T1>75%), and a light transmittance at wavelengths between 550 nm to 750 nm (T2) of the light recycle layer may be less than 10% (T2<10%). In another embodiment of the present disclosure, a light transmittance at wavelengths between 420 nm to 480 nm (T1) of the light recycle layer 25 may be greater than 85% (T1>85%), and a light transmittance at wavelengths between 550 nm to 750 nm (T2) of the light recycle layer may be less than 3% (T2<3%).

In the backlight module without the light recycle layer 25, when the blue light emitting from the light emitting diodes 13 is converted into the white light via the color conversion element 24, the generated red light and green light may scatter or reflect, and the white light conversion efficiency may be reduced, resulting in the light utilization decreased.

In the backlight module of the present embodiment, the light recycle layer 25 has high transmittance at wavelengths between 420 nm to 480 nm, so the blue light emitting from the light emitting diodes 13 having the wavelengths between 420 nm to 480 nm may pass through the light recycle layer 25 and then pass through the color conversion element 24. Even though a part of the blue light may be reflected by the first brightness enhancement film 21, the diffusion film 22 or the second brightness enhancement film 23, the reflected blue light may be reflected back by the reflective layer 12 on the substrate 11 and pass through the layers and/or the films above the reflective layer 12. In addition, the light recycle layer 25 has low transmittance at wavelengths between 550 nm to 750 nm, so most of the red light and green light obtained by the conversion of the color conversion element 24 and achieving the light recycle layer 25 may be reflected by the light recycle layer 25 and pass through the layers and/or the films above the light recycle layer 25. Hence, the light recycle layer 25 may reduce the light scattering to improve the utilization of the light emitting from the light emitting diodes 13. Therefore, the luminous efficiency can be improved about 50% or more.

In addition, in the backlight module 10 of the present embodiment, there is a distance OD between a surface 122 of the reflective layer 12 and the color conversion element 24. More specifically, there is a distance OD between the upper surface 122 of the reflective layer 12 and the upper surface 241 of the color conversion element 24. This distance OD is an optical distance. In addition, there is a gap P between two adjacent light emitting diodes 13. More specifically, there is a gap P between central points of two adjacent light emitting diodes 13. Herein, a ratio of the distance OD to the gap P is greater than 0.09 and less than 0.38 (0.09<OD/P<0.38). In another embodiment of the present disclosure, the ratio of the distance OD to the gap P is greater than 0.17 and less than 0.38 (0.17<OD/P<0.38). In another embodiment of the present disclosure, the ratio of the distance OD to the gap P is greater than 0.09 and less than 0.28 (0.09<OD/P<0.17). The overall thickness of the backlight module 10 is thinner or the used amount of the light emitting diodes 13 is less as the ratio of the distance OD to the gap P is smaller. It should be noted that the scales of the distance OD and the gap P shown in the figures are not consistent with those actually used, and the ratio of the distance OD to the gap P actually used is defined above.

Furthermore, the backlight module 10 of the present embodiment is assembled in a frame 3, and emits light upward (as indicated by the arrow). Although the figure does not show, the electronic device of the present embodiment may further comprise a display panel disposed on the backlight module 10. In this case, the light emitting from the backlight module 10 (as indicated by the arrow) can pass through the display panel, and the electronic device can achieve the display effect.

Figure 2:
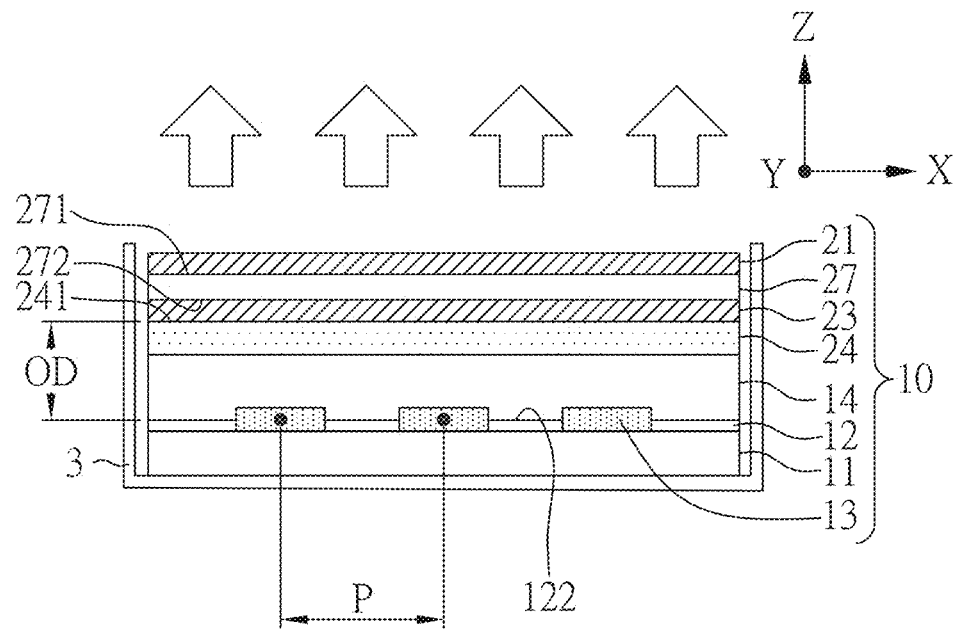
FIG. 2 is a cross-sectional view of a backlight module of an electronic device according to another embodiment of the present disclosure.

FIG. 2 is a cross-sectional view of a backlight module of an electronic device according to another embodiment of the present disclosure. The elements in FIG. 2 identical or similar to those shown in FIG. 1 are indicated by the same or similar numbers, and the descriptions thereof are not repeated again. The backlight module shown in FIG. 2 is similar to that shown in FIG. 1, except for the following differences.

The backlight module 10 shown in FIG. 2 does not comprise the light recycle layer 25 shown in FIG. 1. In addition, there is no diffusion film 22 (as shown in FIG. 1) disposed between the first brightness enhancement film 21 and the second brightness enhancement film 23, but an optical film 27 with microstructure array is disposed therebetween.

As shown in FIG. 2, the backlight module 10 of the present embodiment further comprises an optical film 27 with microstructure array disposed on the protection layer 14, and the optical film 27 with microstructure array is disposed between the first brightness enhancement film 21 and the second brightness enhancement film 23. Hereinafter, several optical films 27 with different microstructure array are explained below.

Figure 3A:
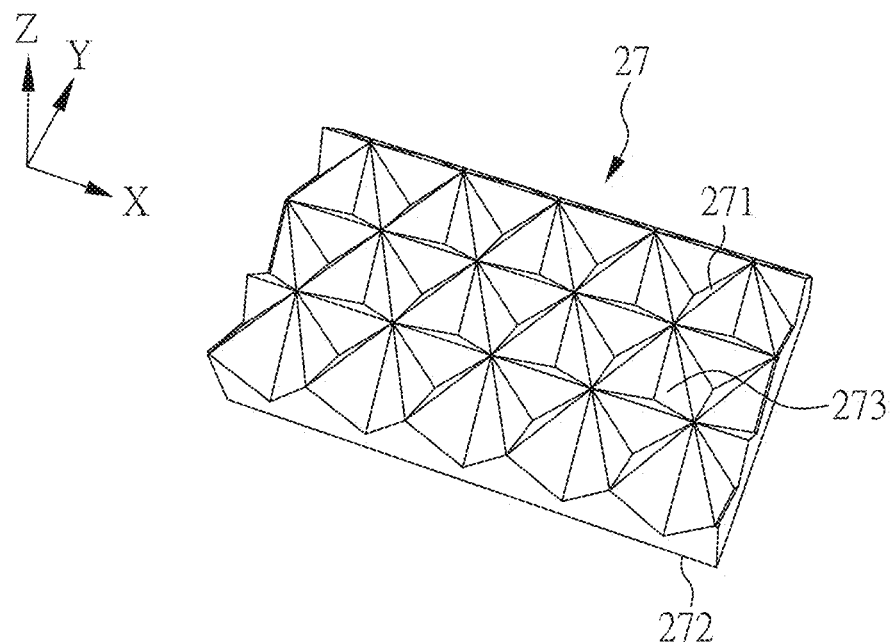
FIG. 3A is a three-dimensional schematic view of an optical film with microstructure array according to one aspect of the present disclosure.
Figure 3B:
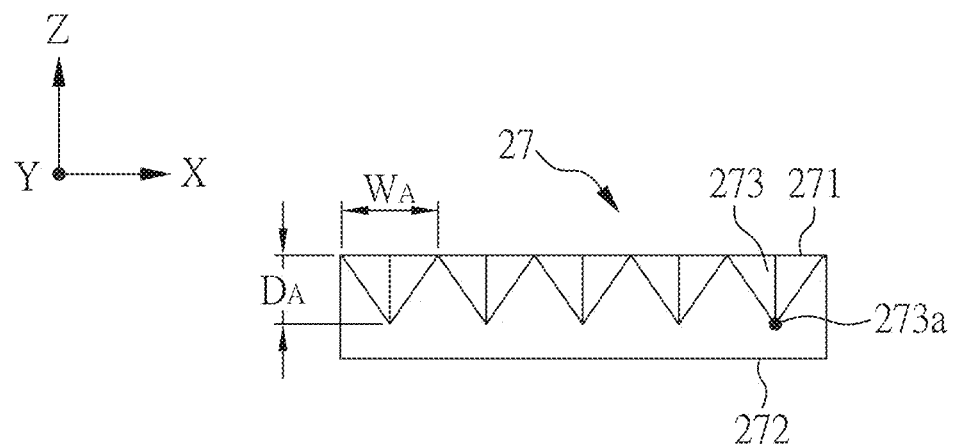
FIG. 3B is a cross-sectional view of the optical film with microstructure array shown in FIG. 3A.

FIG. 3A is a three-dimensional schematic view of an optical film with microstructure array according to one aspect of the present disclosure and FIG. 3B is a cross-sectional view of the optical film with the microstructure array shown in FIG. 3A. As shown in FIG. 2 and FIG. 3A, the optical film 27 with microstructure array of the present embodiment comprises an upper surface 271 and a bottom surface 272 opposite to the upper surface 271, and the bottom surface 272 faces the protection layer 14. A plurality of polyhedron cavities 273 are disposed on the upper surface 271 and the polyhedron cavities 273 are arranged in an array. The array arrangement can be a repeated arrangement of 2D or 3D structures regularly arranged at a specific direction. For example, as shown in FIG. 3A, the polyhedron cavities 273 are repeated and regularly arranged at the X direction and the Y direction. In FIG. 3A, the polyhedron cavities 273 are regular tetrahedron cavities, also called as inverted pyramid cavities. As shown in FIG. 3A and FIG. 3B, the widths $W_A$ of the polyhedron cavities 273 may be respectively ranged from 50 μm to 180 μm (50 μm≤$W_A$≤180 μm), and the depths $D_A$ of the polyhedron cavities 273 may be respectively ranged from 10 μm to 50 μm (10 μm≤$D_A$≤50 μm). More specifically, the widths $W_A$ of the polyhedron cavities 273 may be the maximum widths of the polyhedron cavities 273. The depths $D_A$ of the polyhedron cavities 273 may be the maximum depths of the polyhedron cavities 273, which may also be defined by the distances from the height of the upper surface 271 of the optical film 27 with microstructure array to the heights of the points 273a of the polyhedron cavities 273. In addition, in the present embodiment, the bottom surface 272 is a plane surface.

Figure 4A:
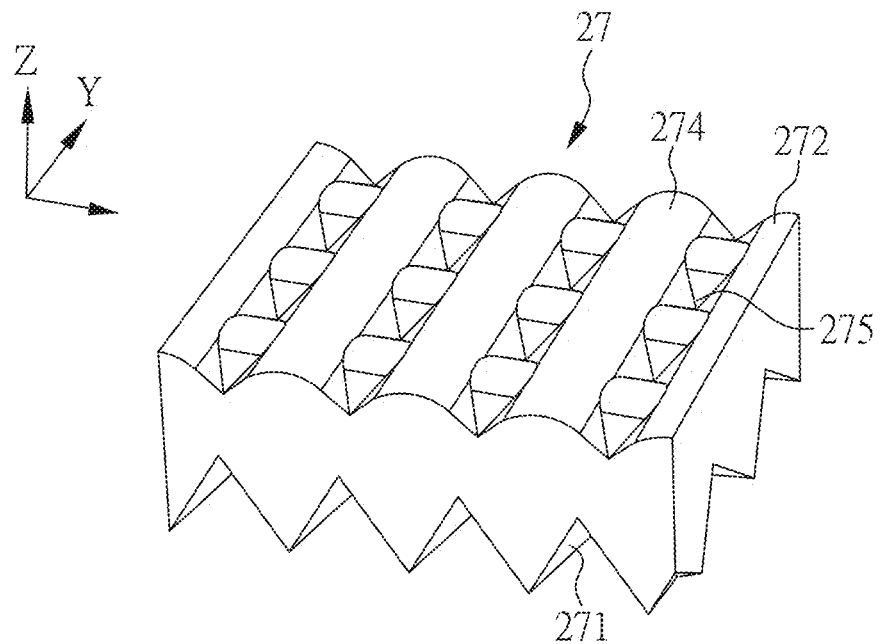
FIG. 4A is a three-dimensional schematic view of an optical film with microstructure array according to another aspect of the present disclosure.
Figure 4B:
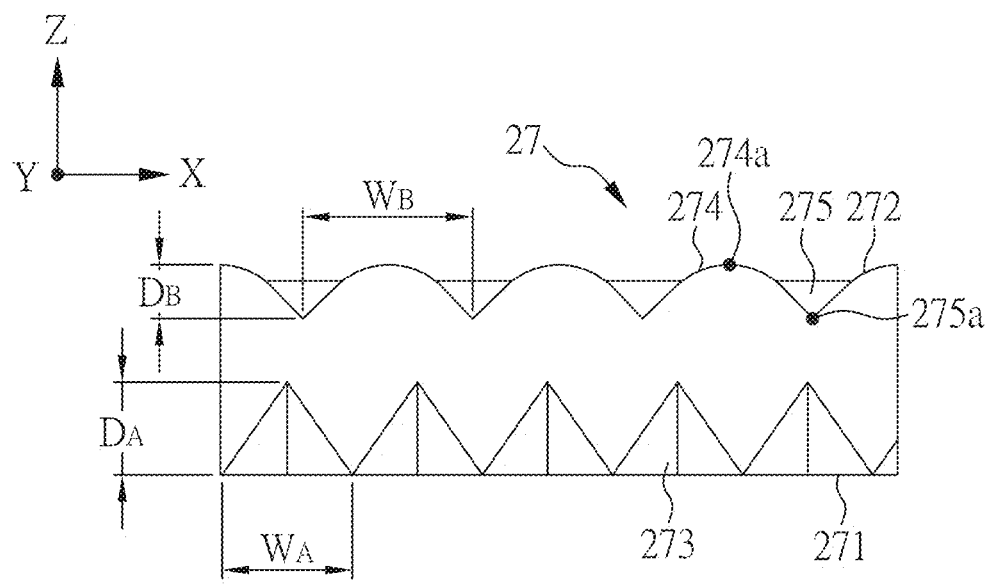
FIG. 4B is a cross-sectional view of the optical film with microstructure array shown in FIG. 4A.

FIG. 4A is a three-dimensional schematic view of an optical film with microstructure array according to another aspect of the present disclosure and FIG. 4B is a cross-sectional view of the optical film with the microstructure array shown in FIG. 4A. The optical film 27 with microstructure array shown in FIG. 4A and FIG. 4B is similar to that shown in FIG. 3A and FIG. 3B, except for the bottom surface 272. Herein, the structure related to the upper surface 271 of the optical film 27 with microstructure array shown in FIG. 4A and FIG. 4B is not described again.

As shown in FIG. 4A and FIG. 4B, a plurality of column protrusions 274 are disposed on the bottom surface 272 of the optical film 27 with microstructure array and the column protrusions 274 are crossed. More specifically, the column protrusions 274 are extended at two different directions and crossed to each other. In addition, plural recesses 275 are formed between adjacent column protrusions 274, and the formed recesses 275 are also arranged in an array. As shown in FIG. 4A and FIG. 4B, the widths $W_B$ of the column protrusions 274 may be respectively ranged from 35 μm to 115 μm (35 μm≤$W_B$≤115 μm). More specifically, the widths $W_B$ may be the maximum widths of the column protrusions 274, which can also be defined by the distance between two adjacent recess ends 275a. The depths $D_B$ of the recesses 275 may be respectively ranged from 1 μm to 30 μm (1 μm≤$D_B$≤30 μm). More specifically, the depths $D_B$ may be the maximum depths of the recesses 275, which can also be defined by the distance from a height of a recess end 275a to a height of the top point 274a of the column protrusion 274.

In addition, even not shown in the figure, another optical film 27 with microstructure array in which the upper surface 271 and the bottom surface 272 are disposed with the polyhedron cavities 273 shown in FIG. 3A and FIG. 3B can also be used in the present disclosure. When the bottom surface 272 is disposed with the polyhedron cavities, the features of the polyhedron cavities disposed on the bottom surface 272 are similar to the features of the polyhedron cavities 273 disposed on the upper surface 271 shown in FIG. 3A and FIG. 3B, and are not described again.

In the backlight module without the optical film 27 with microstructure array, the gaps between two adjacent light emitting diodes 13 have to be narrowed to achieve the desired visual effect. Thus, the used amount of the light emitting diodes 13 has to be increased, resulting in the manufacturing cost of the backlight module increased. Alternatively, additional prism films have to be used in the backlight module, resulting in the brightness of the backlight module decreased.

As shown in FIG. 2, when the backlight module 10 comprises the optical film 27 with microstructure array having the aforesaid feature, the microstructure can improve the backlight uniformity of the backlight module 10. In addition, the disposition density of the light emitting diodes 13 per unit area can also be decreased by using the optical film 27 with microstructure array. Thus, the gap P between two adjacent light emitting diodes 13 can be increased, and the used amount of the light emitting diodes 13 can be decreased. Therefore, the ratio of the distance OD between the surface 122 of the reflective layer 12 and the color conversion element 24 to the gap P between two adjacent light emitting diodes 13 (OD/P) can further be decreased. Meanwhile, the manufacturing cost of the backlight module can further be reduced because the used amount of the light emitting diodes 13 is decreased.

Figure 5:
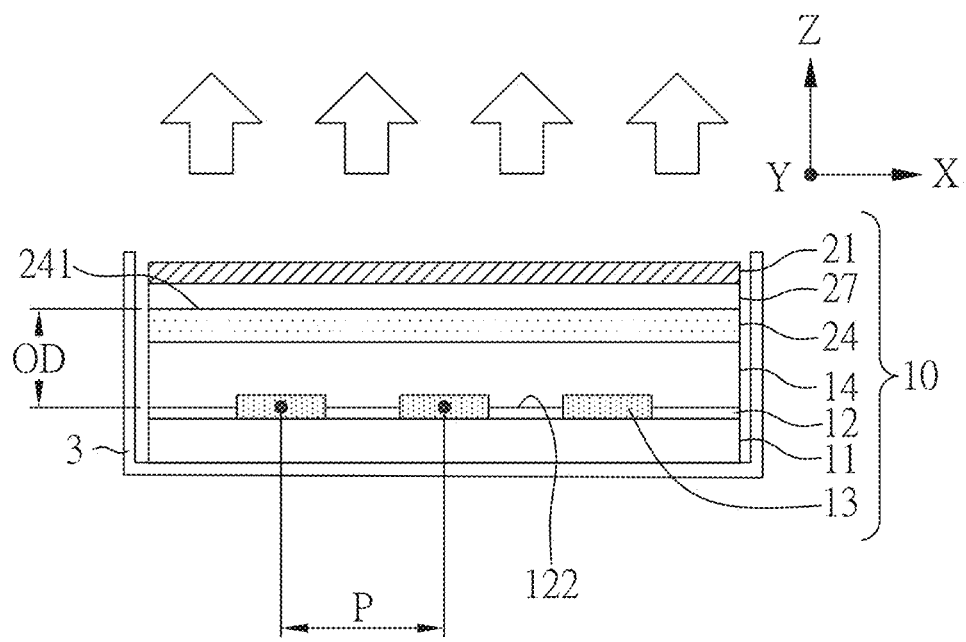
FIG. 5 is a cross-sectional view of a backlight module of an electronic device according to another embodiment of the present disclosure.

FIG. 5 is a cross-sectional view of a backlight module of an electronic device according to another embodiment of the present disclosure. The elements in FIG. 5 identical or similar to those shown in FIG. 1 and FIG. 2 are indicated by the same or similar numbers, and the descriptions thereof are not repeated again. The backlight module shown in FIG. 5 is similar to that shown in FIG. 2, except for the following differences.

The backlight module 10 of FIG. 5 does not comprise the second brightness enhancement film 23 shown in FIG. 2. Since the backlight module 10 of FIG. 5 comprises the first brightness enhancement film 21 but does not comprise another brightness enhancement film, the overall thickness of the backlight module 10 can be decreased, In addition, compared to the backlight module without any brightness enhancement film, the brightness of the backlight module 10 shown in FIG. 5 can also be effectively enhanced.

Figure 6:
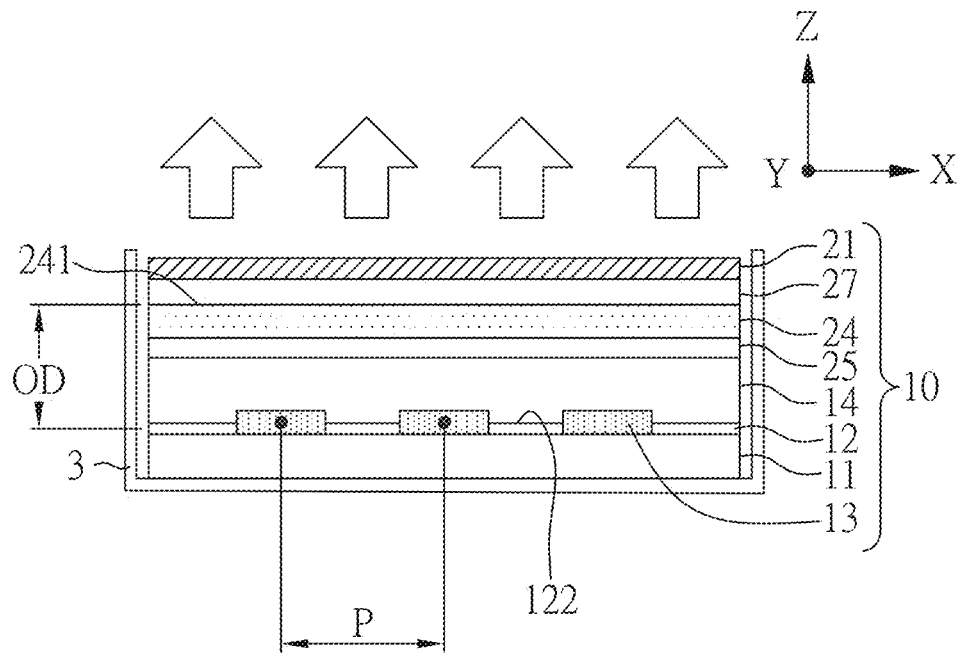
FIG. 6 is a cross-sectional view of a backlight module of an electronic device according to another embodiment of the present disclosure.

FIG. 6 is a cross-sectional view of a backlight module of an electronic device according to another embodiment of the present disclosure. The elements in FIG. 6 identical or similar to those shown in FIG. 1 and FIG. 2 are indicated by the same or similar numbers, and the descriptions thereof are not repeated again. The backlight module shown in FIG. 6 is similar to that shown in FIG. 5, except for the following differences.

The backlight module 10 of FIG. 6 comprises the first brightness enhancement film 21 but does not comprise another brightness enhancement film, and further comprises a light recycle layer 25 disposed on the protection layer 14, wherein the color conversion element 24 is disposed on the light recycle layer 25. Herein the feature and the structure of the light recycle layer 25 are similar to those illustrate above, and are not described again.

The backlight module 10 of FIG. 6 comprises the light recycle layer 25 and the optical film 27 with microstructure array. Thus, the light scattering may be reduced to improve the light utilization, and the backlight uniformity of the backlight module 10 can further be improved. In addition, the disposition density of the light emitting diodes 13 may also be reduced, and the power consumption of the backlight module 10 may further be decreased.

In particular, compared to the conventional backlight module, the number of the light emitting diodes 13 used in the backlight module 10 shown in FIG. 6 can be reduced to about 40%, but the light utilization of the backlight module 10 can be increased to about 180% and the power consumption of the backlight module 10 can be decreased to about 50%. For example, in a 6-inch backlight module, 4500-5000 LEDs have to be used in the conventional backlight module to achieve the 500-nit brightness of the backlight module, but the number of LEDs can be reduced to 1800-2000 when using the backlight module of the present disclosure. When the backlight module is driven by 2.6 W, the brightness of the conventional backlight module is about 500 nit, but the brightness of the backlight module of the present disclosure can be increased to 900 nit. In other words, the light utilization of the backlight module of the present disclosure can be increased to about 180% under the same driving condition. In the condition that the brightness of the backlight module is 500 nit, the power consumption of the conventional backlight module is about 2.6 W, but the power consumption of the backlight module of the present disclosure can be decreased to about 1.3 W. In addition, the ratio of the distance OD between the surface 122 of the reflective layer 12 and the color conversion element 24 to the gap P between two adjacent light emitting diodes 13 (OD/P) has to be greater than 0.38 to achieve the desired visual effect in the display device using the conventional backlight module. However, in the display device using the backlight module 10 shown in FIG. 6, the visual effect of the display device can be improved when OD/P is greater than 0.17.

Figure 7:
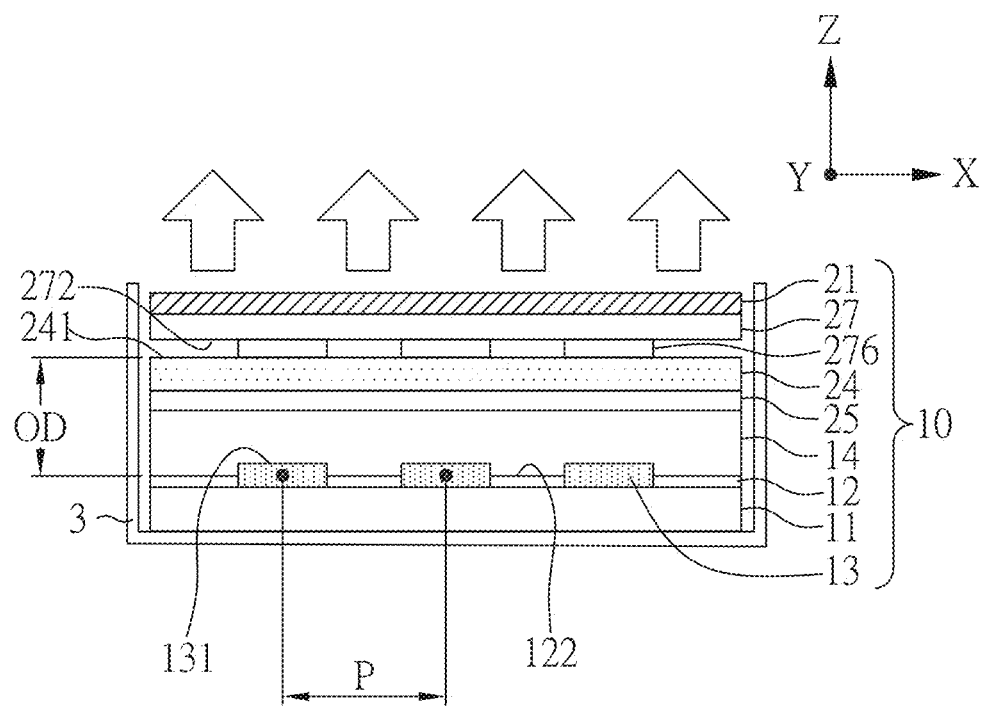
FIG. 7 is a cross-sectional view of a backlight module of an electronic device according to further another embodiment of the present disclosure.

FIG. 7 is a cross-sectional view of a backlight module of an electronic device according to another embodiment of the present disclosure. The elements in FIG. 7 identical or similar to those shown in FIG. 1 and FIG. 2 are indicated by the same or similar numbers, and the descriptions thereof are not repeated again. The backlight module shown in FIG. 7 is similar to that shown in FIG. 6, except for the following differences.

In the backlight module 10 shown in FIG. 7, the optical film 27 with microstructure array is the optical film 27 with microstructure array shown in FIG. 3A and FIG. 3B, and the bottom surface 272 is a plane surface which is selectively disposed with at least one reflective unit 276. Herein, the reflective unit 276 is disposed correspondingly to one of the light emitting diodes 13. In other words, the reflective unit 276 and the light emitting diode 13 are at least partially overlapped from a top view (at the direction Z). In the present embodiment, each reflective unit 276 corresponds to one light emitting diode 13, but the present disclosure is not limited thereto. In another embodiment of the present disclosure, a portion of the light emitting diodes 13 may correspond to the reflective units 276, and the remaining portion of the light emitting diodes 13 may not correspond to the reflective units 276. In addition, an area (A1) of the reflective unit 276 can be 50% to 150% of an area (A2) of the upper light emitting surface 131 of the light emitting diode 13, i.e. 50%≤A1/A2≤150%.

The reflective unit 276 can be formed on the bottom surface 272 through a coating process, an adhering process, a sputtering process or other suitable process. The reflective unit 276 may comprise a material with reflectivity, for example, white ink or metals (for example, Ag, Al, Au, Cr or an alloy thereof). The reflectivity of the reflective unit 276 may be ranged from 75% to 99%. In another embodiment of the present disclosure, the reflectivity of the reflective unit 276 may be ranged from 80% to 95%. Herein, the term "reflectivity" refers to the percentage of the measured brightness of the light reflected by the reflective unit 276 divided by the measured brightness of the light before reflecting by the reflective unit 276. The brightness mentioned in the present disclosure refers to the integral value of the spectrum of the light (herein, the light may comprise, for example, the display light or the environment light), and the light may comprise, for example, visible light (for example, having wavelengths between 380 nm and 780 nm) or UV light (for example, having wavelengths less than 365 nm); but the present disclosure is not limited thereto.

When the reflective unit 276 is disposed on the bottom surface 272 of the optical film 27 with microstructure array, the light utilization can further be improved, and the brightness or the uniformity of the backlight module can further be improved.

In other embodiments of the present disclosure, the color conversion element 24 may be integrated with the protection layer 14. More specifically, the color conversion element 24 comprises phosphors, quantum dots or a combination thereof, which are added into the optical gel, the silicone gel or the semi-transparent gel of the protection layer 14. Thus, the overall thickness of the backlight module 10 can further be reduced.

In the present disclosure, the disposition order of the color conversion element 24 and the optical film 27 with microstructure array is not particularly limited. For example, in the backlight module 10 shown in FIG. 2 and FIG. 5 to FIG. 7, the optical film 27 with microstructure array is disposed on the color conversion element 24. However, in another embodiment of the present disclosure, the color conversion element 24 may be disposed on the optical film 27 with microstructure array.

In the present disclosure, the used amount of the optical film 27 with microstructure array is not particularly limited. For example, in the backlight module 10 shown in FIG. 2 and FIG. 5 to FIG. 7, plural optical films 27 with microstructure arrays can be selectively used. When plural optical films 27 with microstructure arrays are used, the structure of each optical film 27 with microstructure array can be the same or different according to the design. In addition, the disposition position of each optical film 27 with microstructure array may be the same or different, and for example, may be respectively disposed on or below the color conversion element 24.

In conclusion, the electronic device provided by the present disclosure has the backlight module with a specific structure. Thus, the purpose of reducing the disposition density of the light sources (i.e. the light emitting diodes), decreasing the manufacturing cost, improving the light efficiency, reducing the power consumption or improving the visual effect of the display device can be achieved.

In the present disclosure, the features in different embodiments of the present disclosure can be mixed to form another embodiment without departing from the spirit and scope of the disclosure as hereinafter claimed.

Although the present disclosure has been explained in relation to its embodiment, it is to be understood that many other possible modifications and variations can be made without departing from the spirit and scope of the disclosure as hereinafter claimed.

In addition, the aforesaid embodiments are used as examples for explanation, and the scope of the present disclosure is defined by the claims hereinafter and is not limited to the aforesaid embodiments.

What is claimed is:

1. An electronic device, comprising:
   a backlight module, comprising:
      a substrate;
      a plurality of light emitting diodes disposed on the substrate, wherein the plurality of light emitting diodes are blue light emitting diodes;
      a protection layer disposed on the substrate and covering the plurality of light emitting diodes; and
      a color conversion element disposed on the plurality of light emitting diodes; and
      a light recycle layer disposed on the protection layer, wherein the light recycle layer is disposed between the color conversion element and the protection layer,
   wherein a light transmittance at wavelengths between 420 nm to 480 nm of the light recycle layer is greater than 75%, and a light transmittance at wavelengths between 550 nm to 750 nm of the light recycle layer is less than 10%.

2. The electronic device of claim 1, wherein the protection layer directly contacts the plurality of light emitting diodes.

3. The electronic device of claim 1, wherein a refractive index of the protection layer is ranged from 1.4 to 1.6.

4. The electronic device of claim 1, wherein the protection layer comprises an optical gel, a silicone gel, a semi-transparent gel or a combination thereof.

5. The electronic device of claim 1, wherein the backlight module further comprises a first brightness enhancement film disposed on the color conversion element.

6. The electronic device of claim 1, wherein the backlight module further comprises a reflective layer disposed on the substrate and disposed between two adjacent light emitting diodes of the plurality of light emitting diodes.

7. The electronic device of claim 6, wherein there is a distance between a surface of the reflective layer and the color conversion element, there is a gap between the two adjacent light emitting diodes of the plurality of light emitting diodes, and a ratio of the distance to the gap is greater than 0.09 and less than 0.38.

8. The electronic device of claim 1, wherein the backlight module further comprises an optical film with microstructure array disposed on the protection layer.

9. The electronic device of claim 8, wherein the backlight module further comprises a first brightness enhancement film disposed on the optical film.

10. The electronic device of claim 8, wherein the optical film has an upper surface and a bottom surface opposite to the upper surface, and the bottom surface faces the protection layer; wherein a plurality of polyhedron cavities are disposed on the upper surface, and the plurality of polyhedron cavities are arranged in an array.

11. The electronic device of claim 10, wherein widths of the plurality of polyhedron cavities are respectively ranged from 50 μm to 180 μm, and depths of the plurality of polyhedron cavities are respectively ranged from 10 μm to 50 μm.

12. The electronic device of claim 10, wherein a plurality of column protrusions are disposed on the bottom surface, the plurality of column protrusions are crossed, and a recess is formed between adjacent column protrusions of the plurality of column protrusions.

13. The electronic device of claim 12, wherein widths of the plurality of column protrusions are respectively ranged from 35 μm to 115 μm, and a depth of the recess is ranged from 1 μm to 30 μm.

14. The electronic device of claim 10, wherein the bottom surface is a plane surface.

15. The electronic device of claim 14, wherein at least one reflective unit is disposed on the bottom surface, and the at least one reflective unit is disposed correspondingly to at least one of the plurality of light emitting diodes.

16. The electronic device of claim 15, wherein an area of the at least one reflective unit is 50% to 150% of an area of an upper surface of the at least one of the plurality of light emitting diodes.

17. The electronic device of claim 15, wherein a reflectivity of the at least one reflective unit is ranged from 75% to 99%.

18. The electronic device of claim 1, wherein the color conversion element is disposed on the light recycle layer.

19. The electronic device of claim 1, which the plurality of light emitting diodes are respectively a light emitting diode with five light emitting surfaces.

* * * * *